(12) United States Patent
Matsuda et al.

(10) Patent No.: US 10,480,564 B2
(45) Date of Patent: Nov. 19, 2019

(54) WASHER AND VEHICLE STRUCTURE

(71) Applicants: AOYAMA SEISAKUSHO CO., LTD., Niwa-Gun (JP); TOYOTA JIDOSHA KABUSHIKI KAISHA, Toyota-Shi (JP)

(72) Inventors: Takashi Matsuda, Nissin (JP); Toshinao Wada, Miyoshi (JP); Hideharu Koketsu, Niwa-Gun (JP); Masato Kanbe, Niwa-Gun (JP); Shigeki Matsunami, Niwa-Gun (JP); Yukinori Fujimoto, Niwa-Gun (JP)

(73) Assignees: Aoyama Seisakusho Co., Ltd., Niwa-Gun (JP); Toyota Jidosha Kabushiki Kaisha, Toyota-Shi (JP)

( * ) Notice: Subject to any disclaimer, the term of this patent is extended or adjusted under 35 U.S.C. 154(b) by 209 days.

(21) Appl. No.: 15/655,958

(22) Filed: Jul. 21, 2017

(65) Prior Publication Data

US 2018/0087559 A1 Mar. 29, 2018

(30) Foreign Application Priority Data

Sep. 29, 2016 (JP) .................... 2016-190520

(51) Int. Cl.
*F16B 43/00* (2006.01)
*B62D 27/06* (2006.01)

(52) U.S. Cl.
CPC ............ *F16B 43/004* (2013.01); *F16B 43/00* (2013.01); *B62D 27/065* (2013.01)

(58) Field of Classification Search
CPC .......... F16B 21/18; F16B 39/24; F16B 43/00; F16B 43/001; F16B 43/004; B62D 27/065

USPC ... 411/337, 353, 368, 371.1–371.2, 517, 531
See application file for complete search history.

(56) References Cited

U.S. PATENT DOCUMENTS

| | | | | |
|---|---|---|---|---|
| 1,721,326 A | * | 7/1929 | Wilson | F16B 43/00 277/649 |
| 3,168,321 A | * | 2/1965 | Glicksman | F16B 43/001 277/637 |
| 3,170,365 A | * | 2/1965 | Vaughn | F16B 31/005 411/532 |
| 3,376,714 A | * | 4/1968 | Manoni | F16D 7/025 411/531 |
| 3,500,712 A | * | 3/1970 | Wagner | F16B 43/001 411/369 |
| 3,531,850 A | * | 10/1970 | Durand | F16B 2/005 29/432 |

(Continued)

FOREIGN PATENT DOCUMENTS

| | | |
|---|---|---|
| CN | 201027787 Y | 2/2008 |
| CN | 205226023 U | 5/2016 |

(Continued)

OTHER PUBLICATIONS

Chinese Office Action (Application No. 201710700290.4) dated Dec. 26, 2018.

(Continued)

*Primary Examiner* — Roberta S Delisle
(74) *Attorney, Agent, or Firm* — Burr & Brown, PLLC

(57) ABSTRACT

There is provided a structure capable of ensuring a bearing surface pressure on an inner diameter side and an outer diameter side of a washer even if a thickness of the washer is suppressed. In a washer used at a fastening portion of a vehicle, a configuration in which a bearing surface is sectionalized into two faces, an inner abutting face and an outer abutting face, by an annular groove is adopted.

2 Claims, 4 Drawing Sheets

(56) References Cited

U.S. PATENT DOCUMENTS

| | | | | |
|---|---|---|---|---|
| 3,588,787 | A | * | 6/1971 | Bushey et al. .......... H01R 4/24 |
| | | | | 411/531 |
| 5,908,278 | A | * | 6/1999 | Hasan ................ E04D 5/145 |
| | | | | 411/368 |
| 6,082,942 | A | * | 7/2000 | Swick ................ H01R 4/304 |
| | | | | 411/160 |
| 6,497,543 | B1 | * | 12/2002 | Lyons ............. B23K 35/0288 |
| | | | | 219/98 |
| 2006/0012132 | A1 | | 1/2006 | Wu |
| 2011/0228412 | A1 | | 9/2011 | Sakata |
| 2013/0266397 | A1 | | 10/2013 | Amano et al. |
| 2016/0052562 | A1 | | 2/2016 | Yoshida et al. |

FOREIGN PATENT DOCUMENTS

| | | |
|---|---|---|
| JP | S48-21710 | 6/1973 |
| JP | 2002-089535 A1 | 3/2002 |
| JP | 2008-030679 A1 | 2/2008 |
| JP | 2008-132985 A1 | 6/2008 |
| JP | 2010-025320 A1 | 2/2010 |
| JP | 2011-194924 A1 | 10/2011 |
| JP | 2012-219841 A1 | 11/2012 |
| JP | 2013-217458 A1 | 10/2013 |
| JP | 2014-005859 A1 | 1/2014 |
| JP | 2016-043743 A1 | 4/2016 |

OTHER PUBLICATIONS

Japanese Office Action (Application No. 2016-190520) dated Jun. 5, 2018 (with English translation).

Japanese Office Action (Application No. 2016-190520) dated Mar. 6, 2018.

* cited by examiner

WASHER AND VEHICLE STRUCTURE

TECHNICAL FIELD

The present invention relates to a washer, and a vehicle structure that uses the washer.

BACKGROUND ART

As described in patent document 1, a technique for enhancing an operational stability of a vehicle is being developed. Other than patent document 1, other techniques for enhancing the operational stability of the vehicle can be considered, one of which is to enhance the operational stability of the vehicle by placing a relatively thick washer at a fastening portion. The inventor of the present invention focused on such technique, and conducted an experiment to check how the operational stability changes when the washer is incorporated at the fastening portion.

Specifically, the operational stability was checked for when the washer was not used, when a washer having a thickness of 4 mm was used, and when a washer having a thickness of 8 mm was used. According to the experiment, the operational stability was poor when the washer was not used, and the operational stability was relatively poor when the washer having the thickness of 4 mm was used. On the contrary, satisfactory operational stability was obtained when the washer having the thickness of 8 mm was used.

CITATION LIST

Patent Document

Patent document 1: Japanese Unexamined Patent Publication No. 2012-219841

However, a problem of weight increase arises if the thickness of the washer is increased. The inventor of the present invention thus considered obtaining a vehicle structure that achieves a satisfactory operational stability while suppressing the thickness of the washer. To review such aspect, an analytical value of a bearing surface pressure was first acquired. Specifically, analytical values for when a washer having a thickness of 2 mm was used, when a washer having a thickness of 4 mm was used, and a washer having a thickness of 8 mm was used were acquired. A diameter of each washer is about 22 mm. The result is as shown in FIG. 7. A vertical axis of FIG. 7 shows a magnitude of the bearing surface pressure at a collar end, and a horizontal axis shows a radial length. In FIG. 7, only the analytical values at a region that abuts against a right half side of a flat washer 101 shown in FIG. 8 are shown.

As the result shown in FIG. 7 obtained, it was found that the bearing surface pressure is distributed so as to be high on an inner diameter side and an outer diameter side when the washer having the thickness of 8 mm was used. This leads to increase in rigidity of the fastening portion. On the other hand, it was found that the thinner the thickness of the washer, the lower the bearing surface pressure on the outer diameter side becomes. The inventor of the present invention thus considered that it is possible to enhance the operational stability of the vehicle while suppressing the increase in the thickness of the washer with a structure in which the bearing surface pressure on the inner diameter side and the outer diameter side of the washer can be ensured even if the thickness of the washer is suppressed.

SUMMARY OF THE INVENTION

Problems to be Solved by the Invention

The present invention is contrived from such background, and the present invention aims to obtain a structure capable of ensuring a bearing surface pressure on an inner diameter side and an outer diameter side of a washer even if a thickness of the washer is suppressed.

Means for Solving the Problems

The following means are adopted to solve the problem described above. A first means relates to a washer used at a fastening portion of a vehicle, the washer having a configuration in which a bearing surface is sectionalized into two faces, an inner abutting face and an outer abutting face, by an annular groove.

A second means relates to a configuration in which a depth of the groove is shorter than a radial length of the groove in the first means.

A third means relates to a vehicle structure in which the washer of the first or second means is interposed between a vehicle component and a head of a bolt, the vehicle structure including an annular space defined by the annular groove and the vehicle component.

Effects of the Invention

In the first means, the bearing surface pressure on the inner diameter side and the outer diameter side of the washer can be ensured even if the thickness of the washer is suppressed.

In the second means, the bearing surface can be sectionalized into the inner abutting face and the outer abutting face while ensuring the rigidity of the washer.

In the third means, the vehicle structure in which the operational stability is ensured while suppressing the weight of the washer can be obtained.

DESCRIPTION OF THE EMBODIMENT

Figure 1:
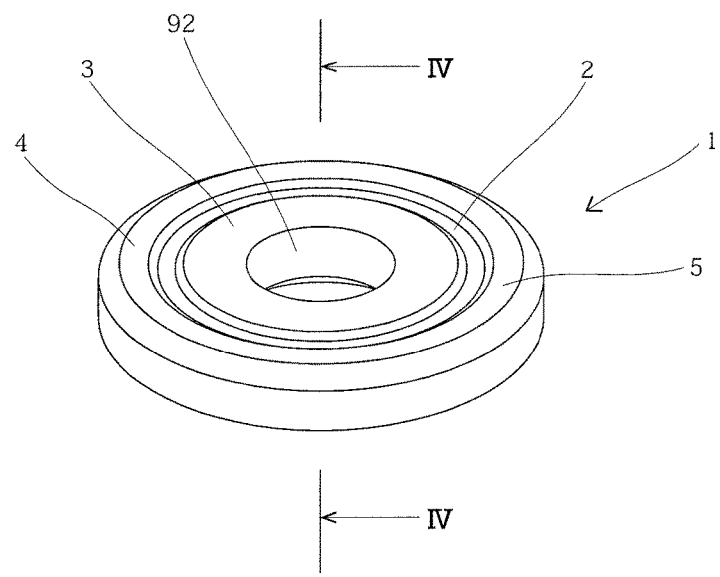
FIG. 1 is a perspective view of a washer of an embodiment with a surface formed with a groove shown on an upper side.
Figure 2:
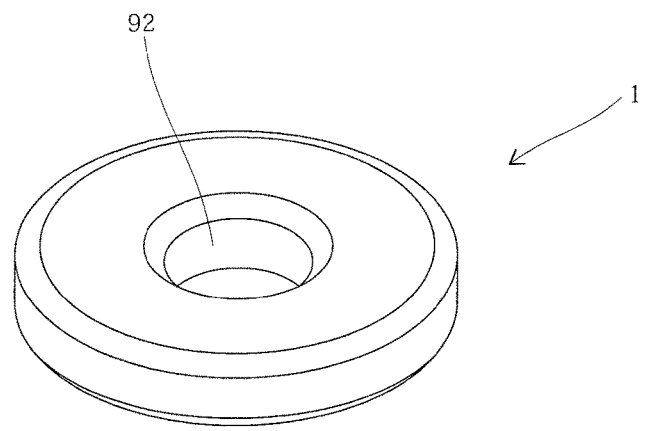
FIG. 2 is a perspective view in which a surface opposite to FIG. 1 is shown on the upper side.
Figure 3:
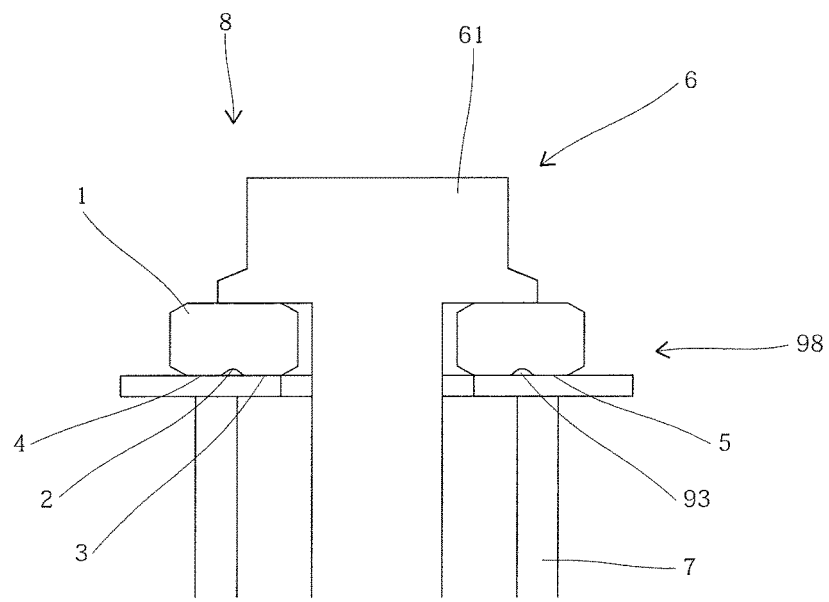
FIG. 3 is a schematic view showing a relationship of the washer of the embodiment, a bolt, and a vehicle component (collar)
Figure 4:
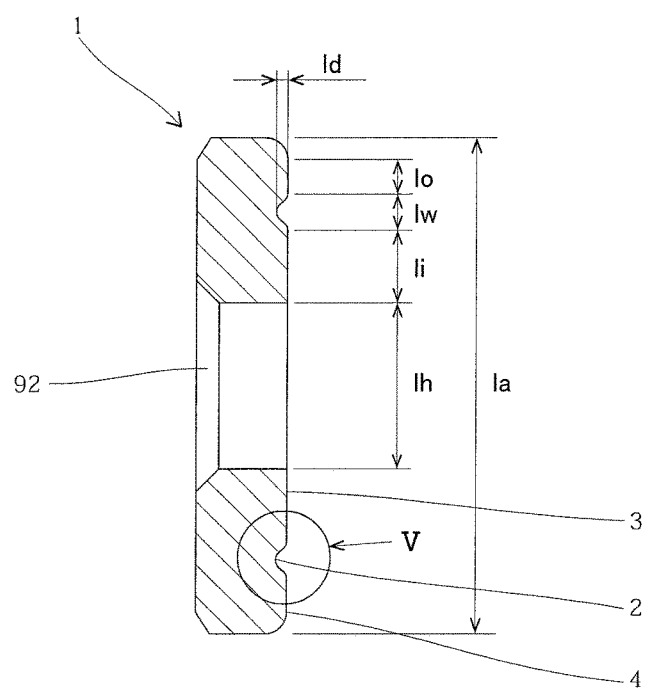
FIG. 4 is a cross-sectional view taken along IV-IV of FIG. 1.
Figure 5:
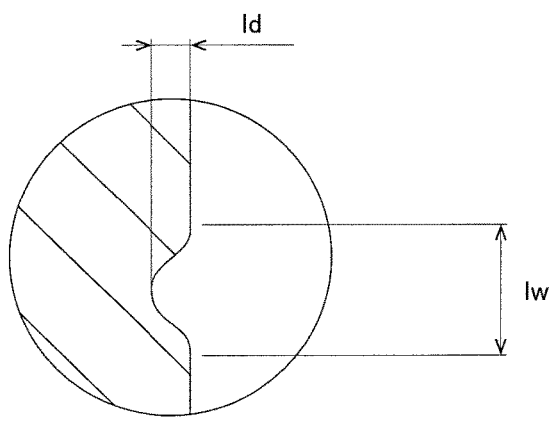
FIG. 5 is a partially enlarged view of region V in FIG. 4.

A mode for implementing the invention will be described below. FIG. 1 is a perspective view of a washer 1 according to an embodiment with a surface formed with a groove 2 shown on an upper side. FIG. 2 is a perspective view in which a surface opposite to FIG. 1 is shown on the upper side. FIG. 3 is a schematic view showing a relationship of the washer of the embodiment, a bolt, and a vehicle component 7. FIG. 4 is a cross-sectional view taken along IV-IV of FIG. 1. FIG. 5 is a partially enlarged view of region V in FIG. 4.

As shown in FIGS. 1 and 2, the washer 1 of the present embodiment has a doughnut shape with a pass-through hole 92 at a center of a disc as a basic form, and has a configuration in which an annular groove 2 is formed on one surface. The washer 1 is used at a fastening portion 98 of the vehicle, and includes the annular groove 2 on a bearing surface 5 that abuts against the vehicle component 7. The bearing surface 5 is sectionalized into two regions, a region on an inner diameter side and a region on the outer diameter side, by the annular groove 2. The region on the inner diameter side of the annular groove 2 is an inner abutting face 3 that abuts against the vehicle component 7, and is configured to a planar shape. The region on the outer diameter side of the annular groove 2 is an outer abutting face 4 that abuts against the vehicle component 7, and is configured to a planar shape.

As shown in FIG. 3, a load is applied from a head 61 of a bolt 6 toward the vehicle component 7 with respect to a vehicle structure 8 fastened with the washer 1 interposed between the vehicle component 7 and the head 61 of the bolt 6. Since the load is not transmitted to a region not abutting against the vehicle component 7, an annular space 93 defined by the annular groove 2 and the vehicle component 7 does not become a transmission path of the load and only the inner abutting face 3 and the outer abutting face 4 become the transmission path of the load. Therefore, the load is propagated so as to be dispersed to the inner abutting face 3 and the outer abutting face 4 of the washer 1.

In the washer 1 of the present embodiment, a surface on the side opposite the surface formed with the groove 2 is not formed with an annular groove, and has a planar shape from the outer diameter side to the inner diameter side. At the outer diameter end of the washer 1, chamfering is performed on the surface formed with the groove 2 as well as the surface on the opposite side thereof.

As can be understood from the illustration in FIGS. 4 and 5, the washer 1 of the present embodiment has a depth ld of the groove 2 configured shorter than a radial length lw of the groove 2. Therefore, the bearing surface can be sectionalized to the inner abutting face 3 and the outer abutting face 4 while ensuring the rigidity of the washer 1. In the present example, a ratio of the depth ld of the groove 2 and the radial length lw of the groove 2 is set to be in a range of 2:5 to 1:4. Furthermore, the washer 1 of the present embodiment is configured such that an area of the inner abutting face 3 is greater than an area of the outer abutting face 4. A radial length li of the inner abutting face 3 is configured to be longer than a radial length lo of the outer abutting face 4. The radial length lw of the groove 2 is configured to be shorter than a length (li+lo) of the radial length li of the inner abutting face 3 and the radial length lo of the outer abutting face 4 combined, and the ratio of lw and (li+lo) is set to be in a range of 1:2 to 1:3. The radial length lw of the groove 2 of the present embodiment is configured to be shorter than the radial length li of the inner abutting face 3, and configured to be longer than the radial length lo of the outer abutting face 4.

Example

A relationship of usage and operational stability of the washer 1 at a fastening area of an instrument panel reinforce and a body of the vehicle was evaluated. Each washer 1 is made of metal, and has a diameter of about 22 mm. A collar was used for the vehicle component 7 that abuts against the washer 1, and a flange bolt was used for the bolt 6. A diameter of the pass-through hole 92 of the invention was 7.3 mm, the radial length li of the inner abutting face 3 was 3.2 mm, the radial length lw of the groove 2 was 1.7 mm, the radial length lo of the outer abutting face 4 was 1.5 mm, and the depth ld of the groove 2 was 0.5 mm. The evaluation result is shown in Table 1.

TABLE 1

| | NO WASHER | FLAT WASHER HAVING THICKNESS OF 4 mm | FLAT WASHER HAVING THICKNESS OF 8 mm | INVENTION HAVING THICKNESS OF 4 mm |
|---|---|---|---|---|
| EVALUATION | x | Δ | ○ | ○ |

The operational stability was poor when the washer was not used, and the operational stability was relatively poor when the flat washer having a thickness of 4 mm was used. Satisfactory operational stability was obtained when the flat washer having a thickness of 8 mm was used and when the invention in which the annular groove 2 is provided on the bearing surface 5 of the washer having a thickness of 4 mm was used. That is, satisfactory operational stability could be obtained while suppressing the increase in the thickness of the washer by using the present invention. Furthermore, as the thickness of the washer can be suppressed, the weight of the washer 1 and the bolt 6 can be suppressed, and furthermore, a space required for the fastening area can be suppressed.

Figure 6:
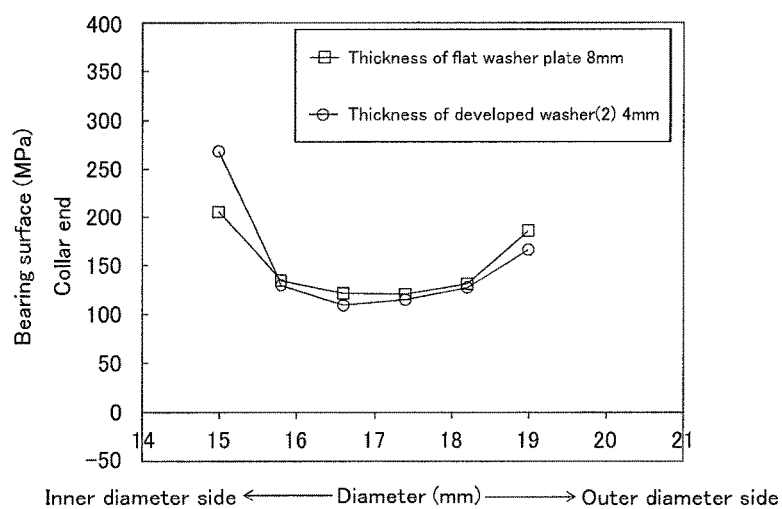
FIG. 6 is a view showing a relationship between an analytical value of a bearing surface pressure at a collar end and a radial position of the washer for the washer of the present embodiment and a flat washer having a thickness of 8 mm, where the analytical value is acquired at six points differing in the radial direction.
Figure 7:
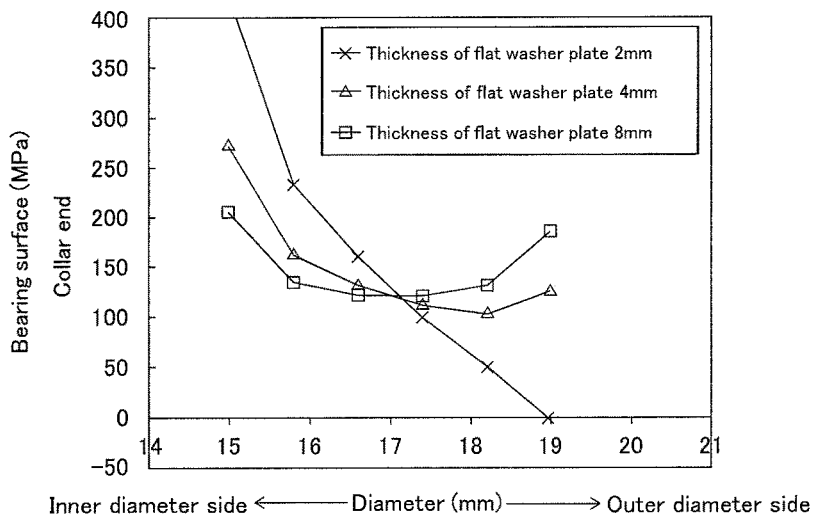
FIG. 7 is a view showing a relationship between the analytical value of the bearing surface pressure at the collar end and the radial position of the washer for flat washers having thicknesses of 2 mm, 4 mm, and 8 mm, where the analytical value is acquired at six points differing in the radial direction.
Figure 8:
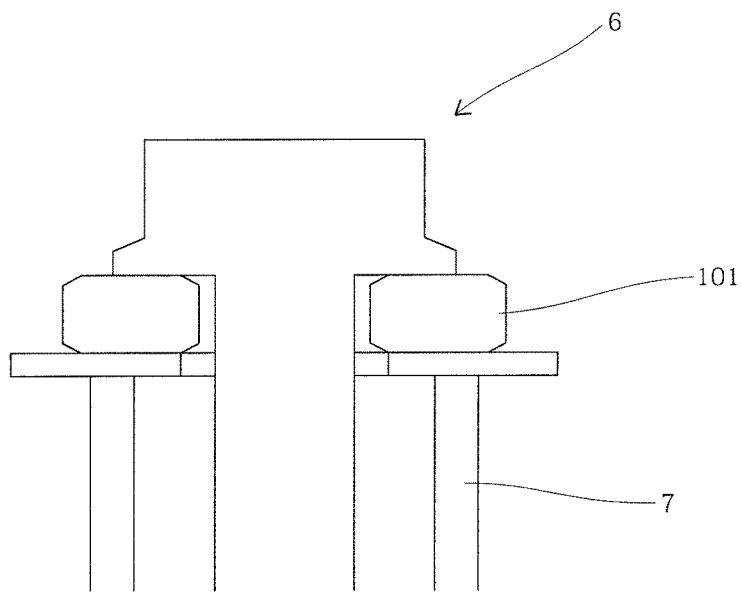
FIG. 8 is a schematic view showing a position relationship of the bolt, the washer, and the vehicle component (collar) in a test.

The result of analyzing the bearing surface pressure at the collar end (end of vehicle component 7) is shown in FIG. 6 for the present invention having a thickness of 4 mm and for the flat washer having a thickness of 8 mm. FIG. 3 is a schematic view showing a relationship of the washer 1, the bolt 6, and the collar (vehicle component 7) of the embodiment. As can be understood from the matters shown in FIG. 6, the bearing surface pressure of the present invention having a thickness of 4 mm showed a distribution similar to the flat washer 101 having a thickness of 8 mm. Furthermore, as can be understood by comparing the matters shown in FIGS. 6 and 7, variation in the bearing surface pressure is suppressed in the present invention compared to the flat washer 101 having the same thickness. Moreover, the bearing surface pressure of both the outer diameter side and the inner diameter side of the washer 1 can be ensured.

It was also found that when the washer 1 of the present embodiment is used, deterioration of a member on the other side abutting against the bearing surface 5 is suppressed compared to when the normal flat washer 101 is used.

The present invention has been described above with regards to the embodiment, but the present invention is not limited by the embodiment, and various modes can be adopted. For example, the area to use the washer is not limited to the fastening area of the instrument panel reinforce and the body, and can be used at each area.

The washer does not need to have both surfaces chamfered. A mode in which both surfaces are not chamfered may be adopted, or a mode in which only one surface is chamfered may be adopted.

The position, width, and length of the groove, the thickness of the washer, and the like are not limited to the configuration of the embodiment. For example, the position of the groove may be at substantially the center of the surface making contact with the member on the other side. In such a case, the radial length of the inner abutting face and the radial length of the outer abutting face become substantially the same.

DESCRIPTION OF SYMBOLS

1 washer
2 groove
3 inner abutting face
4 outer abutting face
5 bearing surface
6 bolt
7 vehicle component
8 vehicle structure
61 head
93 space

The invention claimed is:

1. A washer used at a fastening portion of a vehicle, comprising a bearing surface sectionalized into two faces, an inner abutting face and an outer abutting face, by an annular groove that is provided on only one side of the washer, a depth of the groove is configured to be shorter than a radial length of the groove and a ratio of the depth of the groove and the radial length of the groove is set to be in a range of 2:5 to 1:4.

2. A vehicle structure in which the washer according to claim 1 is interposed between a vehicle component and a head of a bolt, the vehicle structure comprising:
    an annular space defined by the annular groove and the vehicle component.

* * * * *